July 28, 1959 D. MacK. McLAREN 2,897,006
PARTICLE-FORM SOLID MATERIAL SUPPLY APPARATUS
Filed March 28, 1956 4 Sheets-Sheet 1

INVENTOR.
Donald Mac K. McLaren
BY
ATTORNEY

July 28, 1959  D. MacK. McLAREN  2,897,006
PARTICLE-FORM SOLID MATERIAL SUPPLY APPARATUS
Filed March 28, 1956  4 Sheets-Sheet 2

INVENTOR.
Donald MacK. McLaren
BY
*J. P. Moran*
ATTORNEY

INVENTOR.
Donald Mac K. Mc Laren
BY
ATTORNEY

INVENTOR.
Donald MacK. McLaren

United States Patent Office 2,897,006
Patented July 28, 1959

2,897,006

PARTICLE-FORM SOLID MATERIAL SUPPLY APPARATUS

Donald MacK. McLaren, Glasgow, Scotland, assignor to The Babcock & Wilcox Company, New York, N.Y., a corporation of New Jersey Application March 28, 1956, Serial No. 574,506

19 Claims. (Cl. 302—36)

This invention relates in general to particle-form solid material supply apparatus and more particularly to apparatus for supplying particle-form solid material from a region containing gaseous fluid at one pressure to a region containing gaseous fluid at a higher pressure, while maintaining a seal against the flow of gaseous fluid between said regions.

By way of example, the need arises for supplying solid material from a region at lower pressure to a region at higher pressure in combustion apparatus comprising burner means arranged to receive a stream of primary air under superatmospheric pressure and pulverized or granular coal. Various devices have been proposed for forming a seal at the place of entry of coal into a primary air duct arranged to operate under internal pressure. Proper operation of many such devices is dependent upon close mechanical fits designed to reduce air leakage to a minimum. This is true of the various types of "star" wheel and "cell" wheel feeders and of several types of scraper and belt feeders. To obtain the close mechanical fits, accurate and expensive machining of working parts is required and, as such parts are subject to continuous abrasion by the coal and cannot be lubricated, the use of special metals and elaborate provision for readjustment of clearances are often necessary. Moreover, even very small, hard foreign bodies in the fuel may cause failure of devices relying for proper operation on small clearances.

Operation of other devices has depended upon sealing action exerted by the material, as in the screw feeder or the chute in which an upright column of material perhaps several feet in height is packed. In the case of the chute, each particle is held in position only by the force of gravity on the particle and by the forces exerted on it by other particles. In the case of a screw feeder the force of gravity usually exerts little, if any, effect in the sealing action, the material being acted on by the screw so that each particle is held in position by the force exerted on it by the screw itself or/and by the pressure exerted on it by the neighboring particles.

The present invention provides in a system for supplying particle-form solid material from a region containing gaseous fluid at one pressure to a region containing gaseous fluid at a higher pressure a rotor having a discharge outlet opening to the higher pressure region and a peripheral wall constructed and arranged to constrain and compact said material across the discharge outlet upon the application of centrifugal force on the material to seal against flow of gaseous fluid between said regions. Extracting means are provided in the region of higher pressure for dislodging a portion of the compacted material from the rotor discharge outlet into the region of higher pressure at a rate equivalent to the demand for the material. Means for introducing a stream of gaseous fluid into the region of higher pressure are provided for the conveyance of the material thus dislodged to a point of use.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

While various kinds of particle-form solid material can be employed in the apparatus illustrated, the constructions illustrated and hereinafter described are especially designed and particularly adapted for a pulverized coal supply system.

Figure 1:
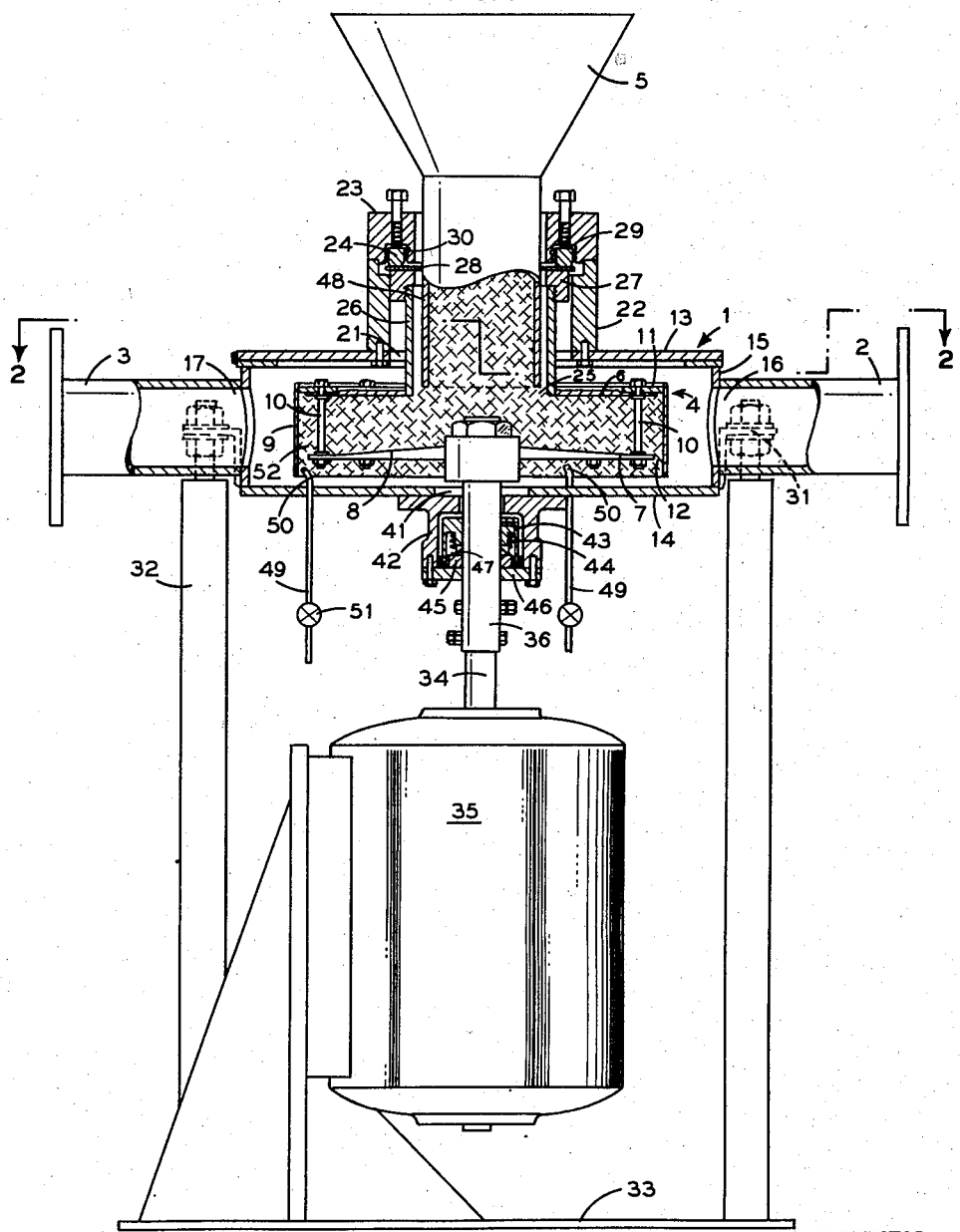
Fig. 1 is an elevation of an arrangement for feeding pulverized coal at a controllable rate through a rotor into an air stream at superatmospheric pressure, the elevation being in section through the vertical axis of the rotor.
Figure 2:
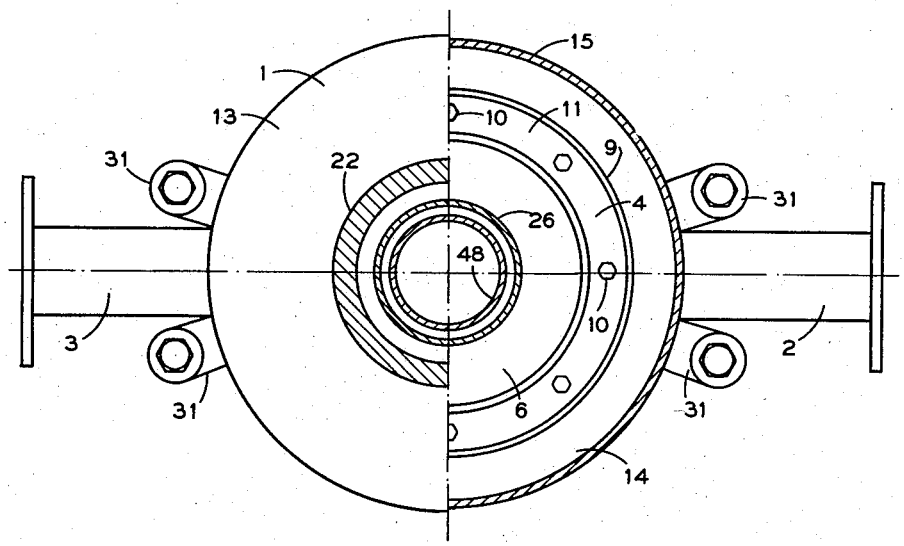
Fig. 2 is a plan view of the arrangement of Fig. 1, the plan view being partly sectional as indicated by the line 2—2 in Fig. 1.
Figure 3:
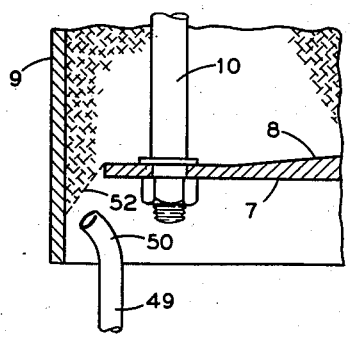
Fig. 3 is an enlarged reproduction of part of Fig. 1.

Referring to Figs. 1 to 3 of the drawings, within a circular casing 1, through which a stream of air at superatmospheric pressure may be passed from an air inlet pipe 2 to an air outlet pipe 3, there is positioned a circular hollow rotor 4 arranged to receive pulverized coal from a superjacent stationary hopper 5 and adapted for the delivery of the pulverized coal to the air stream while causing the pulverized coal to effect a seal against the flow of air from the casing to the atmosphere.

The rotor is arranged for rotation about a vertical axis. It comprises a flat annular upper plate 6 co-axial with the axis of rotation, a circular lower plate 7 also co-axial with the axis of rotation and of which the upper surface 8 except at the hub and at the peripheral parts thereof slopes gently downwardly in every radially outward direction, and a cylindrical peripheral ring wall 9 also co-axial with the axis of rotation and bounding outwardly the space within the rotor. The rotor upper and lower plates 6 and 7 are held in fixed relation to one another by a circular series of spacing rods 10, which also hold the ring wall 9 in proper relative position by securing to the rotor upper plate 6 an annular flange 11 extending radially inwardly from an upper part of the ring wall 9.

The ring wall 9 extends downwardly beyond the rotor lower plate 7 and the outer edge of the rotor lower plate is spaced from the ring wall so that an annular gap or outlet 12, formed between the rotor lower plate and the ring wall, opens downwardly, i.e. laterally with respect to the rotor.

The casing 1 within which the rotor is positioned comprises upper and lower flat annular plates 13 and 14 respectively and a cylindrical peripheral ring wall 15 attached to the upper and lower plates at or near their outer edges, the plate 13 being removably secured in position by a flanged joint. The air inlet pipe 2 leads air radially inwardly into the casing 1 through an aperture 16 in the casing ring wall and the air outlet pipe 3 leads air radially outwardly from the casing 1 through another aperture 17 in the casing ring wall diametrically opposite to the aperture 16.

The casing upper plate 13 has a central aperture 21 therein and has secured to it around the periphery of the aperture 21 an upstanding collar 22. To the top edge of the collar is attached a carrier 23 for a carbon seal ring 24 for a carbon sealing arrangement.

The rotor upper plate also has therein a central aperture 25 and has secured thereto at the periphery of the aperture 25 an upstanding collar 26. To the top edge of the collar 26 is attached a carrier 27 for a metal seal plate 28 for the carbon sealing arrangement.

The carbon seal ring 24 occupies a recess 29 in the carrier 23 therefor and is spring-loaded downwardly so that its lower face is urged into contact with the upper face of the rotary metal seal plate 28; a plastic sealing O-ring 30, inserted in an annular recess in the inner wall of the recess 29 in the carrier 23 bears against the inner surface of the carbon seal ring 24 and prevents air from leakage to the atmosphere through the gap between the carbon seal ring 24 and the carrier 23.

The casing 1 is supported, through four lugs 31 on the ring wall 15, on pillars 32 rising from a base plate 33. The rotor 4 is supported by the vertical shaft 34 of an electric driving motor 35 therefor, secured to a bracket on the base plate 33, through a shaft extension 36 which is secured at its lower end to the motor shaft 34 and at its upper end to the lower plate 7 of the rotor.

At the lower side of the casing lower plate 14, is secured, at the aperture 41 therein through which the shaft extension 36 projects, a housing 42 around the shaft extension for a second carbon sealing arrangement; this carbon sealing arrangement comprises a fixing 43 on the shaft extension within the housing 42, which fixing itself provides a housing for a single helical spring 44 arranged to urge a carbon seal ring 45 rotating with the fixing into contact with a cover plate 46 bolted to the housing. The spring 44 within the fixing also maintains in position a cup leather 47 arranged to prevent the access of air to the small gap between the carbon seal ring 45 and the shaft extension 36.

The rotor is arranged to receive pulverized coal through the central aperture 25 in the rotor upper plate 6. To within a short distance of said aperture there extends within the collar 26 a vertical hollow shaft 48 at the bottom of the hopper 5 for pulverized coal. The hopper with the shaft is supported by any suitable means (not shown).

The discharge of material from the rotor may be effected by extracting means of a mechanical nature, but stationary mechanical extracting means contacting with material moving with the rotor are subject to considerable wear and means are preferable which direct at least one jet of gaseous fluid towards material carried by the rotor and capable of being discharged from the rotor thereby. Such latter means may be arranged, in order to be able to control the rate of discharge of material from the rotor, to be displaceable in position and/or angularly adjustable to vary the jet direction or directions; however, an effective and simpler control of the rate of material discharge from the rotor is by variation of the jet velocity.

Penetrating the casing lower plate 14 are three compressed air pipes 49 arranged to discharge compressed air in jets adjacent the annular gap 12 between the outer edge of the rotor lower plate 7 and the rotor ring wall 9. The discharge end 50 of each compressed air pipe 49 is so oriented as to discharge in a direction having a component of motion opposite to that of the tangential motion of the rotor parts adjacent the pipe discharge end, a component of motion outwardly away from the rotor axis of rotation, and a component of motion upwardly. The three discharge ends of the compressed air pipes are equiangularly spaced around the rotor axis of rotation. The supply of compressed air through the compressed air pipes is under control, for example, by adjusting simultaneously three separate valves 51, one in each compressed air pipe, or, preferably, a single valve through which all the air for the three pipes passes.

In operation, pulverized coal supplied from the hopper 5 through the shaft 48 to the interior of the rotor 4 is centrifugally flung outwardly in the rotor. The rotor being driven at a sufficient speed, the pulverized coal does not, however, without the employment of the air jets, flow continuously, under the forces between the particles and to a lesser extent under gravity, from the interior of the rotor through the annular gap 12, for centrifugal force so strongly urges each particle towards the rotor ring wall 9 that friction prevents the falling of the particles and a free surface 52, stationary with respect to the rotor, tends to be formed at the annular gap or outlet 12 which tends to assume everywhere an angle of repose depending on the centrifugal force. The rotor ring wall 9 extend a sufficient distance below the rotor lower plate to retain the coal under such conditions.

The mean radius of the annular gap 12 with the apparatus shown is 6 inches. The electric motor 35 is designed for rotation of the rotor at a speed of 1450 revolutions per minute, and when so run each particle of material adjacent the annular gap is subject to a centrifugal force over 300 times the weight of the particle due to gravity.

When the air jets are operated, pulverized coal is blown from the annular gap 12 and under the influence of the centrifugal forces acting on the pulverized coal within the rotor and the force of gravity, further coal from within the rotor takes the place of that which has been removed. The coal removed by the air jets is entrained in the air stream leaving the casing through the air outlet pipe 3. The rate at which coal is removed by the air jets from the annular gap or outlet 12 depends upon the rate of supply of compressed air for the jets.

The centrifugal forces acting on the pulverized coal particles within the rotor 4 compact the pulverized coal at least in the outer regions of the rotor interior, whereby the compacted pulverized coal within the rotor effects a seal against the flow of air from within the casing through the pulverized coal to the atmosphere.

The downward slope outwardly of the upper surface 8 of the rotor lower plate 7 is designed to inhibit jamming of the coal during its outward motion in the rotor, for the width between the rotor upper and lower plates 6 and 7 increases as the coal moves outwardly over a large part of the rotor radius.

Assuming that the rotor is full of pulverized coal and pulverized coal stands in the shaft 48 of the hopper, ready to feed into the rotor, and to some intermediate level within the hopper 5, then the pulverized coal in the rotor rotates as a whole with the rotor, the coal within the hopper is wholly or mainly uninfluenced by the rotation of the rotor, while at some intermediate region along the path of coal, the pulverized coal is in a partially fluidized state. Other things being equal, the level of the pulverized coal in the hopper does not affect the rate of coal feed into the air stream through the casing; therefore, it suffices to supply the hopper with pulverized coal in any convenient continuous or intermittent way that will neither overfill the hopper nor allow it to empty; for example, the hopper might be an intermediary hopper into which pulverized coal discharges from an overhead bunker.

The air stream through the casing 1 may be a primary air stream established for carrying pulverized coal at a desired rate to a furnace chamber for combustion therein, for example, a cyclone furnace chamber. The cyclone furnace chamber may fire a steam generator adapted to operate under varying load, and the valve or valves 51 controlling the compressed air supply through the compressed air pipes 49 may be arranged to be automatically controlled by a control impulse derived from a measure of steam pressure at the steam outlet from the steam generator in order, by varying the amount of pulverized coal fed to the cyclone furnace chamber for combustion therein, to maintain a constant steam pressure at said steam outlet. Other control impulses, such as a control impulse derived from a measure of the $CO_2$ content of the gases leaving the cyclone furnace chamber, may if desired be utilized in conjunction with that derived from steam pressure.

Figure 5:
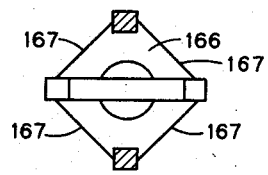
Fig. 5 is a plan view, in section on the line 5—5 of Fig. 4, of a detail of the arrangement of Fig. 4.
Figure 4:
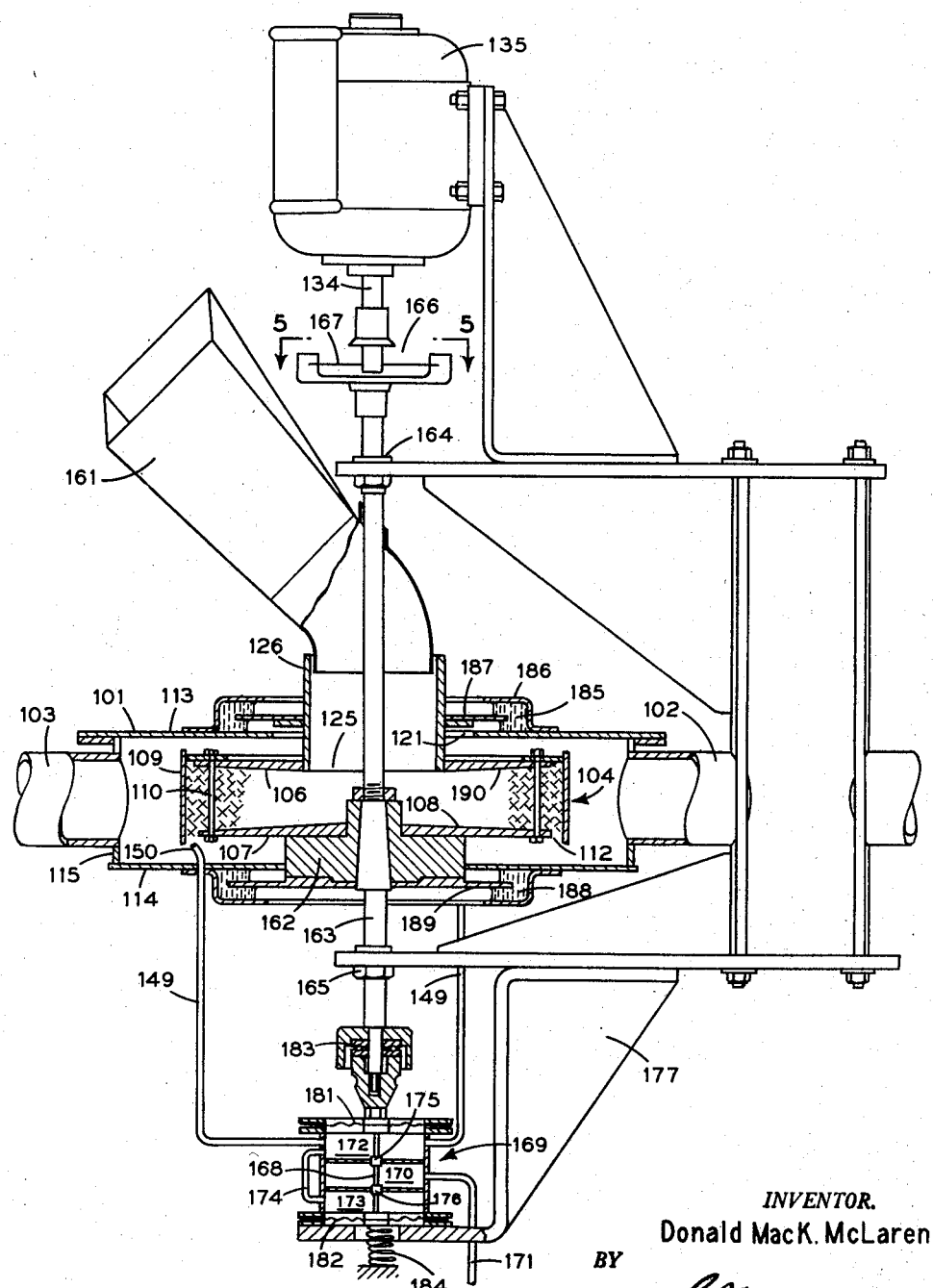
Fig. 4 is a sectional elevation of a modification of the arrangement of Fig. 1.

In Figs. 4 and 5 a modified arrangement is illustrated which is in some respects more complicated than the arrangement of Figs. 1 to 3 but which is designed to avoid the possibility of an undue heating of the pulverized coal by internal friction, as might be feared if the latter arrangement were used in an application where the demand for pulverized coal might be zero for long periods but where the existence of superatmospheric pressure within the casing would nevertheless demand that the rotation of the rotor be continued during such periods for sealing purposes.

Referring to Figs. 4 and 5, the rotor 104 is of similar construction to the rotor 4 described with reference to Figs. 1 to 3, comprising, co-axial with the rotor axis of rotation, upper and lower plates 106 and 107 respectively, a cylindrical peripheral ring wall 109 which bounds outwardly the space within the rotor and which extends below the rotor lower plate 107 between which and the ring wall 109 an annular material outlet gap 112 is formed, and a circular series of spacing rods 110 for holding the upper and lower plates in rigid relationship to one another and for rigidly securing the ring wall to the upper plate.

An upstanding collar 126 is secured to the upper plate 106 around a central aperture 125 therein. The rotor is fed through a stationary chute 161 which discharges into the space within the collar 126 near the top thereof. The rotor is arranged for rotation about a vertical axis within a casing 101 of the same general construction as that described with reference to Figs. 1 and 2, comprising upper and lower plates 113 and 114 respectively connected together and spaced apart from one another by a cylindrical peripheral ring wall 115, to which is secured an air inlet pipe 102 and, diametrically opposite to the air inlet pipe, an air outlet pipe 103.

The rotor lower plate 107 is secured through a boss 162 to a driving shaft 163 slidably borne in a fixed bearing 164 above the casing and a fixed bearing 165 below the casing. The driving motor 135 for the rotor is mounted above the driving shaft in line therewith and its shaft 134 is connected to the driving shaft 163 through a fork drive 166 in which the forks are connected by wires 167 with a degree of slackness permitting the driving shaft to occupy, while being driven, any vertical position within a limited range.

The vertical position of the driving shaft determines the vertical position of the vertical, non-rotating spindle 168 of a compressed air valve 169 of a balanced type. The spindle 168 is in line with the driving shaft 163 and below it, and the casing of the valve is fixedly supported on the bracket 177. This valve has a center chamber 170 to which compressed air is led through an inlet pipe 171, upper and lower chambers 172 and 173 respectively connected together by an equalizing pipe 174, needle type valve members 175 and 176 respectively on the valve spindle for controlling the rate of flow of air from the center chamber simultaneously to the upper and lower chambers, a diaphragm upper wall 181 to the upper chamber connected to the spindle, and a diaphragm lower wall 182 to the lower chamber also connected to the valve spindle, the arrangement being such that a lowering of the valve spindle increases the flow of air through the valve. The weight of the rotor and its contents is transmitted from the rotating driving shaft to the valve spindle 168 by a rotary thrust bearing 183, and is taken up by a helical compression spring 184 at the lower end of the valve spindle.

Three outlet pipes 149 lead from the upper chamber of the compressed air valve, pierce the lower plate 114 of the casing and terminate adjacent the annular gap 112 between the rotor lower plate 107 and the rotor ring wall 109. The discharge ends 150 of the compressed air pipes are oriented in the same way as the discharge ends of the compressed air pipes described with reference to Figs. 1 to 3, and are equiangularly spaced around the rotor axis.

The escape of air from within the casing to atmosphere through the central aperture 121 in the casing upper plate 113 through which the rotor collar 126 projects is prevented by a water seal comprising an annular water channel 185 formed between the upper surface of the casing upper plate 113 and an appropriately shaped member 186 secured to the casing upper plate, into which channel there extends, so as to dip into the water around the whole circumference of the water channel, a plate 187 secured to the outer side of the upstanding collar 126. A similar water seal is formed below the casing lower plate 114, into the channel 188 of which dips a disc 189 secured to the boss 162. The water seals permit vertical movements of the rotor 104 with respect to the casing 101 through a limited range. To some extent they also serve as vibration damping means.

The under surface 190 of the rotor upper plate 106 slopes gently upwardly in every radially outward direction and the upper surface 108 of the rotor lower plate 107 slopes gently downwardly in every radially outward direction to facilitate the movement of pulverized coal within the rotor under the influence of centrifugal force.

In operation, a table feeder, a feeder having endless conveying means, a vibratory feeder, or a feeder of any other suitable type (not indicated), supplies pulverized coal to fall through the stationary chute 161 into the rotor, the rate of supply by the feeder being that at which it is required that pulverized coal shall be taken up by the air stream through the casing. If the air jets are at any time blowing pulverized coal at less than this rate from the annular gap 112, then the weight of pulverized coal carried by the rotor will increase, the spindle 168 of the air valve 169 will be lowered, air will be blown by the air jets at a higher rate and pulverized coal will be removed from the annular gap 112 at a higher rate; similarily but conversely, if the air jets are at any time removing pulverized coal from the annular gap 112 at too high a rate, the spindle 168 of the air valve 169 will be raised, the air jets will pass air at a lower rate and consequently coal will be removed from the annular gap at a lower rate. Thus the air jet control rapidly operates automatically to ensure that the air stream through the casing entrains pulverized coal at the same rate as that at which it is supplied through the chute, the weight of coal carried by the rotor being nearly constant. It is arranged that the rotor is not normally full of coal in operation.

It is arranged that the full control range of jet air can be achieved by only a small vertical displacement of the rotor; there is no great change, therefore, under varying conditions, of the position of the annular gap 112 with respect to the discharge ends 150 of the air pipes 149.

Since there is no zone of transition between a rotating mass and a stationary mass of pulverized coal, the rotor may be kept rotating even when the rate of supply of pulverized coal is zero, without any risk arising from prolonged internal frictional movement within the pulverized coal. Sealing is maintained by the pulverized coal within the outer parts of the rotor, compacted by centrifugal force, and by the water seals.

Figure 6:
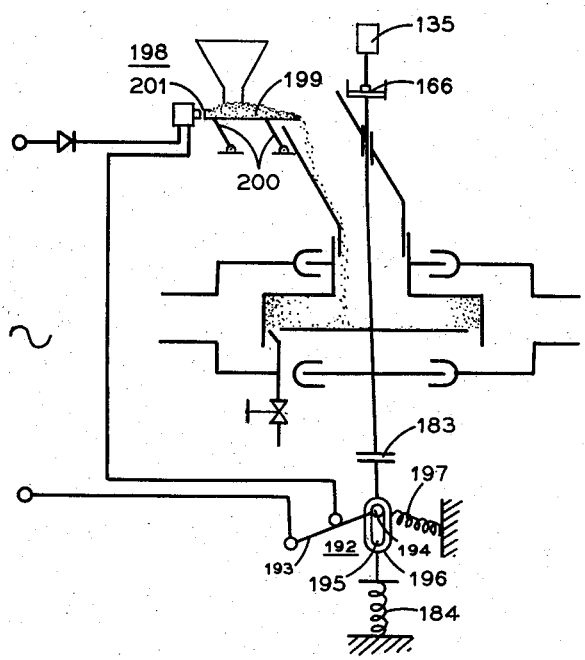
Fig. 6 is a somewhat diagrammatic modification of the arrangement of Figs. 4 and 5 and includes an on-off electric switch for control of a feeder.
Figure 7:
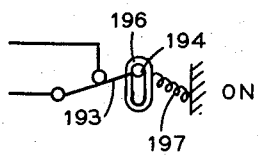
Figs. 7 and 8 show particular positions of the on-off switch during operation.
Figure 8:
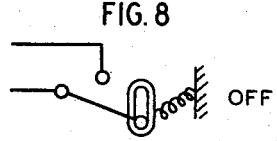

In a further modification of the arrangement of Figs. 1 to 3, the arrangement of Figs. 4 and 5 is modified by replacing the air valve 169 by an on-off electric switch and by employing a feeder, for example an electromagnetically vibrated vibratory feeder for the delivery of the pulverized coal to the rotor 104 through the chute 161, which feeder is controlled by the on-off switch and when running has a rate of delivery higher than the maximum rate at which pulverized coal is to be fed from the rotor into the air stream through the casing. The rate at which pulverized coal is so entrained is controlled by hand, or automatically in dependence upon some external control impulse, by adjusting the rate of supply of air to the air jets. As shown in Figs. 6–8, the air valve 169 of the embodiment illustrated in Fig. 4 is replaced by an on-off electric switch 192 having a movable element 193 operated by a lost motion device shown as a pin 194 in a slot 195 of a guide 196, with a pin snap action to either extreme of the guide provided by a compression spring 197. Fuel is supplied to the chute 161 by a feeder 198 comprising a tray 199 supported by leaf type springs 200 and vibrated by an electromagntic vibrator 201 controlled by the on-off switch 192. It is arranged that when the weight of coal carried by the rotor increases beyond a predetermined value, as must occur after a long or short period of time from the moment when the feeder is started, the on-off electric switch stops the feeder; while when the weight of coal carried by the rotor decreases below a lower predetermined value, as must occur, if the air jets are in operation, after a long or short period of time from the moment when the feeder is stopped, the on-off electric switch restarts the feeder. Said lower predetermined value of the coal quantity within the rotor is such that the desired seal against air pressure within the casing is maintained.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a hollow rotatable rotor disposed within said casing, means for introducing particle-form solid material into said rotor, sealing means providing a fluid-tight relationship between said casing and said rotor, said rotor having a discharge outlet opening to the higher pressure region and a peripheral wall constructed to constrain and compact the particle-form solid material across said rotor outlet upon the application of centrifugal force on said material to seal against flow of gaseous fluid between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys said material thus dislodged through said casing outlet to a point of use, and means responsive to a change in the weight of said material in said rotor for controlling the level of the material in said rotor.

2. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor having a discharge outlet opening to the higher pressure region limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, said extracting means including jet means arranged to discharge gaseous fluid at high velocity against the material compacted across said rotor outlet, means responsive to a change in the weight of said material in said rotor for controlling the level of the material in said rotor.

3. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means permitting movement of said rotor relative to said casing while preventing flow of gaseous fluid therebetween, said rotor having a discharge outlet opening to the higher pressure region and a circumferential wall constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, said extracting means including jet means arranged to discharge gaseous fluid at high velocity against the material compacted across said rotor outlet in a direction opposite to the direction of rotation of said rotor, means responsive to a change in the weight of said material in said rotor for controlling the level of the material in said rotor.

4. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a hollow rotatable rotor disposed within said casing and arranged with its axis of rotation substantially vertical, said rotor having an opening in the upper end thereof for the introduction of particle-form solid material means for gravitationally introducing particle-form solid material through said opening into said rotor, said rotor increasing in width from said opening to the periphery of said rotor to promote uniform flow of material to the rotor periphery, sealing means providing a fluid-tight relationship between said casing and said rotor, said rotor having a discharge outlet opening to the higher pressure region and a circumferential wall constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, means responsive to a change in the weight of said material in said rotor for controlling the level of the material in said rotor.

5. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor comprising a substantially upright circumferential wall and axially spaced end walls one of which cooperates with said circumferential wall to define an annular discharge outlet opening to the region of higher pressure, said circumferential wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, means responsive to a change in the weight of said material in said rotor for controlling the level of the material in said rotor.

6. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means permitting movement of said rotor relative to said casing while preventing flow of gaseous fluid therebetween, said rotor comprising a substantially upright circumferential wall and axially spaced end walls one of which cooperates with said circumferential wall to define an annular discharge outlet opening to the region of higher pressure, said circumferential wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, said extracting means including jet means arranged to discharge gaseous fluid at high velocity against the material compacted across said rotor outlet, means responsive to a change in the weight of said material in said rotor for controlling the level of the material in said rotor.

7. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a hollow rotatable rotor disposed within said casing and arranged with its axis of rotation substantially vertical, said rotor having an opening in the upper end thereof for the introduction of particle-form solid material means for gravitationally introducing particle-form solid material through said opening into said rotor, said rotor increasing in width from said opening to the periphery of said rotor to promote uniform flow of material to the rotor periphery, sealing means permitting movement of said rotor relative to said casing while preventing flow of gaseous fluid therebetween, said rotor comprising a substantially upright circumferential wall and axially spaced end walls one of which cooperates with said circumferential wall to define an annular discharge outlet opening to the region of higher pressure, said circumferential wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, said extracting means including jet means arranged to discharge gaseous fluid at high velocity against the material compacted across said rotor outlet in a direction opposite to the direction of rotation of said rotor, means responsive to a change in the weight of said material in said rotor for controlling the level of the material in said rotor.

8. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor comprising two axially spaced end walls and a peripheral wall extending from one of said end walls in a plane parallel to the rotor axis of rotation to a point outwardly of and radially spaced from the other end wall and defining therebetween an annular outlet opening to the region of higher pressure, said peripheral wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislidging a portion of the compacted particle-form solid material from said rotor outlet into the region of higher pressure, while the gaseous fluid under said higher pressure flowing through said casing conveys the material thus dislodged through said casing outlet to a point of use, means responsive to a change in the weight of said material in said rotor for controlling the level of the material in said rotor.

9. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor comprising two axially spaced end walls and a peripheral wall extending from one of said end walls in a plane parallel to the rotor axis of rotation to a point outwardly of and radially spaced from the other end wall and defining therebetween an annular outlet opening to the region of higher pressure, said peripheral wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys the material thus dislodged, through said casing outlet to a point of use, said extracting means including jet means arranged to discharge gaseous fluid at high velocity against the material compacted across said rotor outlet, means responsive to a change in the weight of said material in said rotor for controlling the level of the material in said rotor.

10. In a system for supplying particle-form material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a hollow rotatable rotor disposed within said casing and arranged with its axis of rotation substantially vertical, said rotor having an opening in the upper end thereof for the introduction of particle-form solid material means for gravitationally introducing particle-form solid material through said opening into said rotor, said rotor increasing in width from said opening to the periphery of said rotor to promote uniform flow of material to the rotor periphery, sealing means permitting movement of said rotor relative to said casing while preventing flow of gaseous fluid therebetween, said rotor comprising two axially spaced end walls and a peripheral wall extending from one of said end walls in a plane parallel to the rotor axis of rotation to a point outwardly of and radially spaced from the other end wall and defining therebetween an annular outlet opening to the region of higher pressure, said peripheral wall being constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, said extracting means including jet means arranged to discharge gaseous fluid at high velocity against the material compacted across said rotor outlet in a direction opposite to the direction of rotation of said rotor, means responsive to a change in the weight of said material in said rotor for controlling the level of the material in said rotor.

11. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor having a discharge outlet opening to the higher pressure region and a substantially upright circumferential wall constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, said extracting means including a plurality of circumferentially spaced pipes each arranged to discharge gaseous fluid at high velocity against the material compacted across said rotor outlet, means responsive to a change in the weight of said material in said rotor for controlling the level of the material in said rotor.

12. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally hollow rotatable rotor disposed within said casing, means for gravitationally introducing particle-form solid material into said rotor, sealing means permitting movement of said rotor relative to said casing while preventing flow of gaseous fluid therebetween, said rotor having a discharge outlet opening to the higher pressure region and a substantially upright circumferential wall constructed and arranged to limit the radial outward movement of said material and to constrain and compact the particle-form solid material across said rotor outlet upon the application of centrifugal force on said material to seal against flow of gaseous fluid through said rotor and between said regions, driving means for said rotor, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, said extracting means including a plurality of circumferentially spaced pipes each arranged to discharge gaseous fluid at high velocity against the material compacted across said rotor outlet in a direction opposite to the direction of rotation of said rotor, means responsive to a change in the weight of said material in said rotor for controlling the level of the material in said rotor.

13. In a system for supplying particle-form solid material from a region containing gaseous fluid at one pressure to a region containing gaseous fluid at a higher pressure, a casing having an inlet for the introduction of a gaseous fluid under said higher pressure and on outlet for the discharge of said material conveyed by gaseous fluid, a horizontally arranged hollow rotatable rotor disposed within said casing, means for gravitationally introducing particle-form solid material into said rotor, sealing means providing a fluid-tight relationship between said casing and said rotor, said rotor having a discharge outlet opening to the higher pressure region and a peripheral wall constructed to constrain and compact the particle-form solid material across said rotor outlet upon the application of centrifugal force on said material to seal against flow of gaseous fluid between said regions, driving means for said rotor, and extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, and means responsive to a change in the weight of said material in said rotor for controlling the amount of said material discharged from said rotor.

14. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a drive shaft, means for gravitationally introducing particle-form solid material into said rotor, sealing means providing a fluid-tight relationship between said casing and said rotor and shaft, said rotor having a discharge outlet opening to the higher pressure region and a peripheral wall constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, means providing for axial movement of said shaft upon a change in weight of said material in said rotor, and means responsive to said axial movement of said shaft for controlling the amount of said material discharged from said rotor.

15. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a drive shaft extending through said casing, means for gravitationally particle-form solid material into said rotor, sealing means permitting movement of said rotor and shaft relative to said casing while preventing flow of gaseous fluid therebetween, said rotor comprising a peripheral wall and axially spaced end walls one of which includes an annular discharge outlet adjacent said peripheral wall opening to the region of higher pressure, said peripheral wall being constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, and means responsive to a change in the weight of said material in said rotor for controlling the amount of said material supplied to said rotor.

16. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a drive shaft extending through said casing, means for gravitationally introducing particle-form solid material into said rotor, sealing means permitting movement of said rotor and shaft relative to said casing while preventing flow of gaseous fluid therebetween, said rotor comprising a peripheral wall and axially spaced end walls one of which includes an annular discharge outlet adjacent said peripheral wall opening to the region of higher pressure, said peripheral wall being constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged through said casing outlet to a point of use, means providing for axial movement of said shaft upon a change in weight of said material in said rotor, and means responsive to said axial movement of said shaft for controlling the amount of said material discharge from said rotor.

17. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a drive shaft extending through said casing, means for gravitationally introducing particle-form solid material into said rotor, sealing means providing a fluid-tight relationship between said casing and said rotor and shaft, said rotor comprising two axially spaced end walls and a peripheral wall extending from one of said end walls in a plane parallel to the rotor axis of rotation to a point outwardly of and radially spaced from the other end wall and defining therebetween an annular outlet opening to the region of higher pressure, said peripheral wall being constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure, while the gaseous fluid under said higher pressure flowing through said casing conveys the material thus dislodged through said casing outlet to a point of use, and means responsive to a change in the weight of said material in said rotor for controlling the amount of said mateiral supplied to said rotor.

18. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a drive shaft extending through said casing, means for gravitationally introducing particle-form solid material into said rotor, sealing means providing a fluid-tight relationship between said casing and said rotor and shaft, said rotor having a discharge outlet opening to the higher pressure region and a peripheral wall constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure while the gaseous fluid under said higher pressure flowing through said casing conveys the material thus dislodged through said casing outlet to a point of use, said extracting means including jet means arranged to discharge gaseous fluid at high velocity against the material compacted across said rotor outlet, and means responsive to a change in the weight of said material in said rotor for controlling the amount of said material discharged from said rotor.

19. In a system for supplying particle-form solid material from a region containing gaseous fluid at one pressure to a region containing gaseous fluid at a higher pressure, a casing having an inlet for the introduction of a gaseous fluid under said higher pressure and an outlet for the discharge of said material conveyed by gaseous fluid, a horizontally arranged hollow rotatable rotor disposed within said casing and having a vertically arranged drive shaft extending through said casing, means for gravitationally introducing particle-form solid material into said rotor including a rotor inlet extending through an aperture in said casing and arranged about the rotor axis of rotation, sealing means permitting movement of said rotor and shaft relative to said casing while preventing flow of gaseous fluid therebetween, said rotor comprising a peripheral wall and axially spaced end walls one of which includes an annular discharge outlet adjacent said peripheral wall opening to the region of higher pressure, said peripheral wall being constructed to constrain and compact the particle-form solid material across said rotor outlet upon the application of centrifugal force on said material to seal against flow of gaseous fluid between said regions, driving means for said rotor and shaft, extracting means in the region of higher pressure for dislodging a portion of the compacted particle-form solid material from said rotor outlet into the region of higher pressure at a rate equivalent to the demand for said material, while the gaseous fluid under said higher pressure flowing through said casing conveys the material thus dislodged in suspension through said casing outlet to a point of use, said extracting means including jet means arranged to discharge gaseous fluid at high velocity against the material compacted across said rotor outlet, means providing for axial movement of said shaft upon a change in weight of said material in said rotor, and means responsive to said axial movement of said shaft for controlling the amount of said material supplied to said rotor.

References Cited in the file of this patent

UNITED STATES PATENTS

| | | |
|---|---|---|
| 1,937,040 | Vogel-Jorgensen | Nov. 28, 1933 |
| 2,032,337 | Vogel-Jorgensen | Feb. 25, 1936 |
| 2,360.464 | Arveson | Oct. 17, 1944 |
| 2,536,402 | Voorhees | Jan. 2, 1951 |